United States Patent [19]

Beauchaine

[11] 3,983,861
[45] Oct. 5, 1976

[54] SOLAR ENERGY CONVERSION DEVICE

[75] Inventor: Alvah D. Beauchaine, Naples, Fla.

[73] Assignee: Westman Manufacturing Company, Naples, Fla.

[22] Filed: Aug. 21, 1975

[21] Appl. No.: 606,567

[52] U.S. Cl. ................................. 126/271; 138/38
[51] Int. Cl.² .................................... F24J 3/02
[58] Field of Search ............... 126/270, 271; 138/38

[56] References Cited
UNITED STATES PATENTS

| 1,940,070 | 12/1933 | Barry et al. | 122/501 |
| 2,872,915 | 2/1959 | Bowen | 126/271 |
| 3,125,091 | 3/1964 | Sleeper, Jr. | 126/271 |
| 3,321,012 | 5/1967 | Hervey | 126/271 |

FOREIGN PATENTS OR APPLICATIONS

| 71,213 | 10/1959 | France | 126/270 |
| 282,819 | 10/1971 | U.S.S.R. | 126/271 |

Primary Examiner—Kenneth W. Sprague
Assistant Examiner—James C. Yeung
Attorney, Agent, or Firm—Oltman and Flynn

[57] ABSTRACT

The present solar energy conversion device has spaced, concentric outer and inner tubes of high conductivity metal, the outer tube having a blackened outside surface and a reflective inside surface. A core rod of low heat conductivity extends concentrically inside the inner tube, and water flows around this core rod in a shallow cylindrical stream inside the inner tube to absorb heat efficiently from the inner tube. The inner tube may have fins on the outside to enhance the heat transfer.

7 Claims, 6 Drawing Figures

SOLAR ENERGY CONVERSION DEVICE

BACKGROUND OF THE INVENTION

Various solar energy conversion devices have been proposed heretofore which operate on the general principle of heating water by absorbing solar radiation. Examples of such proposals are disclosed in U.S. Pat. Nos. 1,855,815 and 3,125,091, both embodying a tube within a tube, the inner tube conducting the water to be heated and the outer tube serving to focus the solar radiation on the inner tube.

SUMMARY OF THE INVENTION

The present invention is directed to a novel and improved solar energy conversion device having an inner tube for conducting the water or other fluid that is to be heated and an outer tube encircling the inner tube. The outer tube has a radiation-absorptive, non-reflective outside surface and a highly reflective inside surface for the purpose of efficiently absorbing solar radiation and transmitting heat inward toward the inner tube. The inner tube has a low conductivity core inside it, and the water or other fluid to be heated flows around this core in a shallow stream next to the inside surface of the inner tube and is efficiently heated by the latter.

In an alternative embodiment, the inner tube is provided with external fins for enhancing the heat transfer to the inner tube.

A principal object of this invention is to provide a novel and improved solar energy conversion device for heating water or another fluid by absorbing the sun's radiation.

Another object of this invention is to provide such a device having outer and inner tubes and a low conductivity core inside the inner tube for restricting the fluid flow therein to the immediate proximity of the inner tube wall for improved heat transfer.

Further objects and advantages of this invention will be apparent from the following detailed description of two presently-preferred embodiments thereof, which are shown in the accompanying drawings in which.

Figures 1, 2, 3, 4, 5, 6:
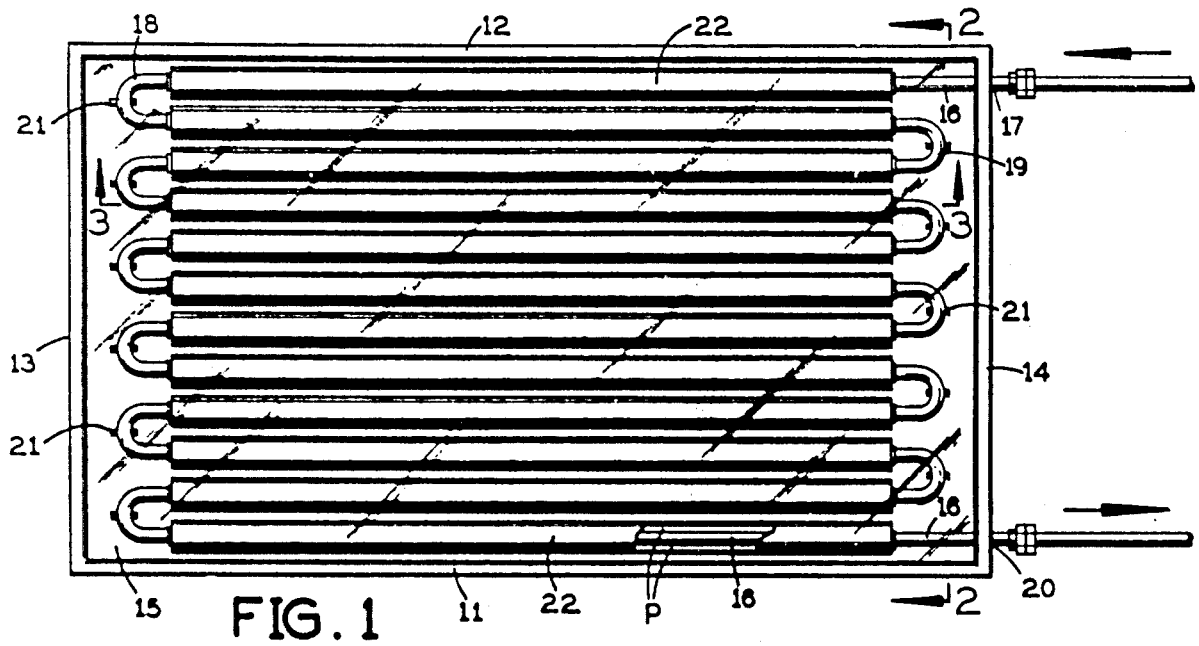
FIG. 1 is a top plan view of a solar energy conversion device embodying the present invention.
FIG. 2 is a cross-section taken along the line 2—2 in FIG. 1.
FIG. 3 is a longitudinal section taken along the line 3—3 in FIG. 1 through one of the heat transfer tube assemblies in accordance with this invention.
FIG. 4 is a cross-section taken along the line 4—4 in FIG. 3.
FIG. 5 is a fragmentary perspective showing in full lines the central core and in phantom the inner tube which receives this core.
FIG. 6 is an enlarged fragmentary perspective view, with parts broken away for clarity, showing a second embodiment of the present invention.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Referring first to FIGS. 1 and 2, the solar energy conversion device which embodies the present invention is shown as having a shallow base tray with a flat, rectangular, broad area bottom wall 10 (FIG. 2), short upstanding front and back walls 11 and 12, and short upstanding end walls 13 and 14 (FIG. 1). This base tray may be of wood, metal or a suitable rigid plastic. Preferably, the inside of the tray is covered with a suitable heat insulation material, such as fiber glass or styrofoam. The top of this tray is covered by a flat, rectangular sheet 15 of glass or other suitable material which is transparent to the sun's rays and has low heat conductivity. The bottom, front, back, end and top walls of the tray are joined to each other in substantially air-tight fashion to provide a dead air space inside the tray.

The energy conversion device has an inner tube 16 for conducting water or other fluid to be heated. This inner tube enters the support tray through an opening at 17 (FIG. 2) formed in the end wall 14 near the back wall 12 and below the glass cover 15. From there the inner tube extends parallel to the back wall 12 for most of the latter's length and then it curves through a 180° turn 18 near the opposite end wall 13. From there it extends back toward the end wall 14 parallel to the back wall 12 until it makes another 180° turn 19 close to end wall 14. From this point the inner tube continues back and forth in serpentine fashion, presenting elongated straight segments which are spaced apart in succession from the back wall 12 toward the front wall 11 and 180 degree turn segments between the successive elongated straight segments. Tube 16 passes out through an opening at 20 in the end wall 14 close to the front wall of the support tray 10–14.

At each successive turn 18 or 19 the inner tube 16 is supported by a rigid metal bracket 21 extending up from the tray bottom 10, as shown in FIG. 2.

Each elongated straight segment of the inner tube 16 is encircled by an outer tube 22. As best seen in FIG. 3, at the opposite ends of each outer tube 22 a flat, transverse, annular wall 23 extends radially inward toward the inner tube. An annular grommet or sleeve 24 of suitable heat insulation material is engaged between the outside of the inner tube 16 and the inside edge of each corresponding end wall 23 of the outer tube to prevent the conduction of heat between them.

Preferably, both the inner tube 16 and the outer tube 22 are of circular cross-section and they are concentric with one another.

In accordance with one aspect of this invention, the outer tube 22 is of high heat conductivity metal, such as aluminum, the outside of which is coated with a flat black paint which is very efficient in absorbing the sun's rays, and the inside of which has a bright finish for maximum reflectivity.

The inner tube 16 is of high conductivity metal, such as copper or aluminum.

In accordance with another aspect of present invention, each elongated straight segment of the inner tube 16 receives a core 25 of suitable low heat conductivity material. As shown in FIG. 3, this core extends inside the inner tube for substantially the entire length of the corresponding outer tube 22. Preferably, as shown, the core is a solid rod of suitable heat insulation plastic or wood, circular in cross-section, and located concentrically inside the corresponding straight segment of the inner tube 16, so that a shallow cylindrical passageway P is formed between the outside of this rod and the inside of the inner tube.

The core 25 carries small, radially-protruding projections 27 near its opposite ends, as shown in FIG. 3, for centering it inside the inner tube 16.

In one practical embodiment, the inner tube 16 has an inside diameter of one inch and the diameter of the core rod 25 is 27/32 inch, so that the cylindrical passageway between them has a radial depth of only 5/64 inch. The shallowness of this cylindrical passageway insures that the water or other fluid flowing through it will be efficiently heated.

The outer tube 22 effectively absorbs the sun's rays because of the absorptivity of its blackened outer surface. The outer tube 22 transmits this heat inwardly because of its own high heat conductivity and the reflectivity of its inside surface. The heat from the outer tube is transmitted to the inner tube 16 by convection through the dead air space between them. This heat is absorbed by the high conductivity inner tube 16, and is absorbed from the latter by the shallow cylindrical stream of water of other fluid which flows between the inside of the inner tube and the core rod 25 inside it.

FIG. 6 shows an alternative embodiment which is the same as in FIGS. 1–5 except that the inner tube 16 is provided with radial fins to enhance the heat transfer effect. In this embodiment, a plurality of flat, annular, radially-disposed fins 30 are attached to the outside of a cylindrical metal sleeve 31 which snugly engages the outside of the inner tube 16. The fins 30 are spaced apart in succession along the length of the outer tube 22. The outer edge of each fin is spaced from the inside of the outer tube to avoid the conduction of heat between them. The purpose of these fins is to increase the rate at which heat is transferred by convection from the outer tube 22 to the inner tube 16.

In extensive tests on a prototype unit as shown in FIGS. 1–5, during the hours from 10:00 A.M. to 4:00 P.M., at Naples, Florida, with an average ambient air temperature of about 90°F., and with a flow rate of 0.375 gallon of water per minute, a water temperature increase averaging about 20°F occurred.

I claim:

1. In a solar energy conversion device having an elongated outer tube and an elongated inner tube extending longitudinally inside said outer tube and spaced therefrom, the improvement:
    wherein said outer tube has a substantially nonreflective, heat absorptive entire outside surface and a highly heat reflective entire inside surface;
    and further comprising a core of low heat conductivity insulating material extending longitudinally inside said inner tube and spaced from the inside thereof to define therewith a relatively shallow flow passage for fluid to be heated;
    said outer tube comprising a high heat conductivity metallic material;
    and said inner tube also comprising a high heat conductivity metallic material.

2. A solar energy conversion device according to claim 1, wherein said core is rod of solid cross-section composed of low conductivity material.

3. A solar energy conversion device according to claim 2, wherein said inner tube is substantially circular to cross-section, and said rod has a periphery of substantially circular cross-section and is positioned substantially concentrically inside said inner tube.

4. A solar energy conversion device according to claim 3, wherein said outer tube is substantially circular in cross-section and is substantially concentric with said inner tube and said rod.

5. A solar energy conversion device according to claim 1, and further comprising a plurality of transverse fins of high conductivity material conductively attached to the outside of the inner tube and spaced from the inside of the outer tube.

6. A solar energy conversion device according to claim 5, wherein said core is a solid cross-section rod of low heat conductivity material.

7. A solar energy conversion device according to claim 6, wherein said rod, inner tube and outer tube are substantially concentric.

* * * * *